United States Patent
Wünsch et al.

[11] Patent Number: 6,093,771
[45] Date of Patent: Jul. 25, 2000

[54] THERMOPLASTIC MOULDING COMPOUNDS BASED ON VINYL AROMATIC POLYMERS WITH SYNDIOTACTIC STRUCTURE, LOW-VISCOSITY POLYAMIDES AND POLYPHENYLENE ETHERS MODIFIED WITH POLAR GROUPS

[75] Inventors: Josef Wünsch, Schifferstadt; Martin Weber, Neustadt; Gunter Pipper, Bad Dürkheim; Alexander Glück, Freinsheim; Wilfried Vogel; Thomas Heitz, both of Dannstadt-Schauernheim; Stefan Grutke, Neustadt, all of Germany

[73] Assignee: BASF Aktiengesellschaft, Ludwigshafen, Germany

[21] Appl. No.: 09/155,090

[22] PCT Filed: Apr. 3, 1997

[86] PCT No.: PCT/EP97/01671

§ 371 Date: Sep. 21, 1998

§ 102(e) Date: Sep. 21, 1998

[87] PCT Pub. No.: WO97/40097

PCT Pub. Date: Oct. 30, 1997

[30] Foreign Application Priority Data

Apr. 23, 1996 [DE] Germany ............ 196 16 075

[51] Int. Cl.[7] .................................... C08L 77/00
[52] U.S. Cl. .............................. 525/63; 525/905
[58] Field of Search ............................. 525/63

[56] References Cited

FOREIGN PATENT DOCUMENTS

| | | |
|---|---|---|
| 128 195 | 12/1984 | European Pat. Off. . |
| 129 196 | 12/1984 | European Pat. Off. . |
| 299 444 | 1/1989 | European Pat. Off. . |
| 302 485 | 2/1989 | European Pat. Off. . |
| 314 146 | 5/1989 | European Pat. Off. . |
| 422 495 | 4/1991 | European Pat. Off. . |
| 535 582 | 4/1993 | European Pat. Off. . |
| 546 497 | 6/1993 | European Pat. Off. . |
| 608 007 | 7/1994 | European Pat. Off. . |
| 775 728 | 5/1997 | European Pat. Off. . |
| 41 29 499 | 3/1993 | Germany . |
| 96/37552 | 11/1996 | WIPO . |
| 07/11123 | 3/1997 | WIPO . |
| 97/11124 | 3/1997 | WIPO . |

OTHER PUBLICATIONS

Polymer–Polymer Miscibility, Olabisi, 224–245 1979.

JP Abst. 06345923 Dec. 20, 1994.

JP Abst. 08143729 Jun. 4, 1996.

JP Abst. 07048488 Feb. 21, 1995.

JP Abst. 07048487 Feb. 21, 1995.

*Primary Examiner*—Ana Woodward
*Attorney, Agent, or Firm*—Keil & Weinkauf

[57] ABSTRACT

Thermoplastic molding compositions comprise

A) from 5 to 97.9% by weight of a vinylaromatic polymer with syndiotactic structure, B) from 2 to 90% by weight of a low-viscosity polyamide with a viscosity number VN in the range from 50 to 150 ml/g and C) from 0.1 to 50% by weight of a polar-group-modified polyphenylene ether.

5 Claims, No Drawings

THERMOPLASTIC MOULDING COMPOUNDS BASED ON VINYL AROMATIC POLYMERS WITH SYNDIOTACTIC STRUCTURE, LOW-VISCOSITY POLYAMIDES AND POLYPHENYLENE ETHERS MODIFIED WITH POLAR GROUPS

The present invention relates to thermoplastic molding compositions comprising

A) from 5 to 97.9% by weight of a vinylaromatic polymer with syndiotactic structure, B) from 2 to 90% by weight of a low-viscosity polyamide with a viscosity number VN in the range from 50 to 150 ml/g and C) from 0.1 to 50% by weight of a polar-group-modified polyphenylene ether.

The present invention further relates to the use of the thermoplastic molding compositions for producing fibers, films and moldings, and also to the fibers, films and moldings obtainable therefrom.

EP-A 314 146 has disclosed formulations which are composed of syndiotactic polystyrene (s-PS) and polyphenylene ethers (PPE). The polymer systems obtained here have more than one phase, and, although their heat resistance is good, they are very brittle and have unsatisfactory flowability.

EP-A 546 497 describes a formulation of s-PS, inorganic fillers and modified PPE. However, the material here is likewise brittle.

It is an object of the present invention to set aside the disadvantages mentioned and to provide thermoplastic molding compositions which have improved flowability, reduced water absorption, better dimensional stability and improved hydrolysis resistance.

We have found that this object is achieved by means of the thermoplastic molding compositions defined at the outset.

The use of the thermoplastic molding compositions for producing fibers, films and moldings has moreover been found, as have the fibers, films and moldings obtainable therefrom.

The novel thermoplastic molding compositions comprise, as component A), from 5 to 97.9% by weight, preferably from 15 to 89.8% by weight, in particular from 30 to 79.5% by weight, of a vinylaromatic polymer with syndiotactic structure. The term "with syndiotactic structure" here means that the polymers are essentially syndiotactic, i.e. the syndiotactic fraction determined by $^{13}$C-NMR is greater than 50%, preferably greater than 60%.

Component A) is preferably built up of compounds of the formula I

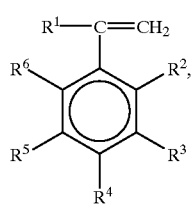

(I)

where:

$R^1$ is hydrogen or $C_1$–$C_4$-alkyl, $R^2$ to $R^6$ independently of one another, are hydrogen, $C_1$–$C_{12}$-alkyl, $C_6$–$C_{18}$-aryl, or halogen, or where two adjacent radicals jointly are a cyclic group having from 4 to 15 carbon atoms.

Use is preferably made of vinylaromatic compounds of the formula I where $R^1$ is hydrogen and $R^2$ to $R^6$ are hydrogen, $C_1$–$C_4$-alkyl, chlorine, phenyl, biphenyl, naphthalene or anthracene, or where two adjacent radicals jointly are a cyclic group having from 4 to 12 carbon atoms, so that the resulting compound of the formula I is, for example, a naphthalene derivative or an anthracene derivative.

Examples of such preferred compounds are:

styrene, p-methylstyrene, p-chlorostyrene, 2,4-dimethylstyrene, m,p-divinylbenzene, 4-vinylbiphenyl, vinylnaphthalene and vinylanthracene.

It is also possible to use mixtures of different vinylaromatic compounds, but it is preferable to use only one vinylaromatic compound.

Particularly preferred vinylaromatic compounds are styrene, p-methylstyrene and m,p-divinylbenzene.

Component A) may also be a mixture of different vinylaromatic polymers with syndiotactic structure, but it is preferable to use only one vinylaromatic polymer, in particular s-PS.

vinylaromatic polymers with syndiotactic structure, and also processes for their preparation, are known per se and are described, for example, in EP-A 535 582. They are preferably prepared by reacting compounds of the general formula I in the presence of a metallocene complex and a cocatalyst. Metallocene complexes used in particular are pentamethyl-pentacyclodienyltitanium trichloride, pentamethylcyclopentadienyltrimethyltitanium, and pentamethylcyclopentadienyltitanium trimethylate.

The vinylaromatic polymers with syndiotactic structure generally have a molecular weight $M_w$ (weight average) of from 5000 to 10,000,000, in particular from 10,000 to 2,000,000. The molecular weight distribution $M_w/M_n$ ($M_n$= number average) are generally in the range from 1.1 to 30, preferably from 1.4 to 10.

The thermoplastic molding compositions comprise, as component B), from 2 to 90% by weight, preferably from 10 to 80% by weight, in particular from 20 to 65% by weight, of a low-viscosity polyamide with a viscosity number VN in the range from 50 to 150 ml/g, preferably from 60 to 150 ml/g, in particular from 70 to 150 ml/g.

The viscosity number VN is determined in 0.5% strength by weight solution in 96% strength sulfuric acid at 25° C.

Polyamides are polycondensates, i.e. polymers which are prepared from monomers with cleavage of low-molecular-weight compounds.

Processes of this type are known to the person skilled in the art and have been described many times in the literature, and more detailed information on this topic is therefore unnecessary here.

Very generally, the molecular weight in preparation processes of this type (and therefore the viscosity) may be controlled in different ways.

One possibility is to terminate the polycondensation after a relatively short reaction time, and this can take place most readily by cooling the reaction mixture.

Another possibility is the addition of molecular weight regulators; these are generally monofunctional compounds which terminate the polycondensation reaction since once they have been incorporated, the chain end has no functional group available for continued condensation anymore. Known examples of molecular weight regulators are monocarboxylic acids or monoalcohols, and monoamines, which are usually used in preparing polyamides.

A final possibility for regulating molecular weight in polycondensations is control via the molar ratio of the starting monomers. It is known that the maximum achievable molecular weight in a polycondensation depends on the molar ratio of the groups reacting with one another in the condensation with cleavage of low-molecular-weight compounds.

It can be seen from the above that the person skilled in the art is familiar with processes for the preparation of low-viscosity polyamides.

A suitable process particularly advantageous for preparing polyamides of this type is that described in EP-A 129 195 and EP-A 129 196.

Preferred polyamides are Poly-ε-caprolactam (Nylon-6), polyhexamethyleneadipamide (nylon-6,6), the copolymers of these, and also partly aromatic copolyamides based on terephthalic acid, and if desired isophthalic acid, adipic acid, hexamethylenediamine and ε-caprolactam, as described, for example, in EP-A 299 444.

Preference is given to polyamides with an approximately equimolar ratio of the two respective end groups.

It is also possible to use mixtures of the polyamides mentioned above.

The novel thermoplastic molding compositions comprise, as component C), from 0.1 to 50% by weight, preferably from 0.2 to 40% by weight, in particular from 0.5 to 20% by weight, of a polar-group-modified polyphenylene ether.

Such polar-group-modified polyphenylene ethers, and also processes for their preparation, are known per se and are described, for example, in DE-A 41 29 499.

Preference is given to the use as component C) of polar-group-modified polyphenylene ethers which are built up from $c_1$) from 70 to 99.95% by weight of a polyphenylene ether, $c_2$) from 0 to 25% by weight of a vinylaromatic polymer, and $c_3$) from 0.05 to 5% by weight of at least one compound which contains at least one double or triple bond and at least one functional group selected from the group consisting of carboxylic acids, carboxylic esters, carboxylic anhydrides, carboxamides, epoxides, oxazolines and urethanes.

Examples of polyphenylene ethers $c_1$) are poly(2,6-dilauryl-1,4-phenylene ether), poly(2,6-diphenyl-1,4-phenylene ether), poly(2,6-dimethoxy-1,4-phenylene ether), poly(2,6-diethoxy-1,4-phenylene ether), poly(2-methoxy-6-ethoxy-1,4-phenylene ether), poly(2-ethyl-6-stearyloxy-1,4-phenylene ether), poly(2,6-dichloro-1,4-phenylene ether), poly(2-methyl-6-phenyl-1,4-phenylene ether), poly(2,6-dibenzyl-1,4-phenylene ether), poly(2-ethoxy-1,4-phenylene ether), poly(2-chloro-1,4-phenylene ether) and poly(2,5-dibromo-1,4-phenylene ether).

Preference is given to the use of polyphenylene ethers in which the substituents are alkyl having from 1 to 4 carbon atoms, such as poly(2,6-dimethyl-1,4-phenylene ether), poly(2,6-diethyl-1,4-phenylene ether), poly(2-methyl-6-ethyl-1,4-phenylene ether), poly(2-methyl-6-propyl-1,4-phenylene ether), poly(2,6-dipropyl-1,4-phenylene ether) and poly(2-ethyl-6-propyl-1,4-phenylene ether).

Examples of preferred vinylaromatic polymers $c_2$) are found in the monograph by Olabisi, pp. 224–230 and 245. Mention may be made here, merely as representative polymers, of vinylaromatic polymers of styrene, chlorostyrene, a-methylstyrene and p-methylstyrene; it is also possible for comonomers, such as (meth)acrylonitrile or (meth)acrylate to be involved in the structure in subordinate proportions (preferably not more than 20% by weight, in particular not more than 8% by weight). Particularly preferred vinylaromatic polymers are polystyrene and impact-modified polystyrene. Mixtures of these polymers may, of course, also be used. Preparation is preferably by the process described in EP-A 302 485.

Examples of suitable modifiers $C_3$) are maleic acid, methylmaleic acid, itaconic acid, tetrahydrophthalic acid, corresponding anhydrides and imides, fumaric acid, the mono- and diesters of these acids, e.g. of $C_1$- and $C_2$- to $C_8$-alkanols, the mono- or diamides of these acids, such as N-phenylmaleimide and maleic hydrazide. Further examples are N-vinylpyrrolidone and (meth)acryloylcaprolactam.

Another group of modifiers includes, for example, the acid chloride of trimellitic anhydride, benzene-1,2-dicarboxylic acid anhydride-4-carboxylic acid acetic anhydride, pyromellitic dianhydride, chloroethanoylsuccinaldehyde, chloroformylsuccinaldehyde, citric acid and hydroxysuccinic acid.

Particularly preferred polar-group-modified polyphenylene ethers C) in the novel molding compositions are obtained by modification with maleic acid, maleic anhydride or fumaric acid. Polyphenylene ethers of this type preferably have a molecular weight (weight average $M_w$) in the range from 10,000 to 80,000, preferably from 20,000 to 60,000.

This corresponds to a reduced specific viscosity nred of from 0.2 to 0.9 dl/g, preferably from 0.35 to 0.8 dl/g and in particular from 0.45 to 0.6 dl/g, measured in a 1% strength by weight solution in chloroform at 25° C. in accordance with DIN 53 726.

The novel thermoplastic molding compositions may additionally comprise from 0 to 50% by weight, preferably from 0 to 15% by weight, in particular from 0 to 12% by weight, of additives or processing aids or mixtures of these.

Examples of these are nucleating agents, such as salts of carboxylic, organic sulfonic or organic phosphoric acids, preferably sodium benzoate, aluminum tris(p-tert-butylbenzoate), aluminum trisbenzoate, aluminum tris(p-carboxymethylbenzoate) and aluminum triscaproate; antioxidants, such as phenolic antioxidants, phosphites or phosphonites, in particular trisnonylphenyl phosphite; stabilizers, such as sterically hindered phenols and hydroquinones. It is also possible to use lubricants and mold-release agents, dyes, pigments and plasticizers.

The novel thermoplastic molding compositions may further comprise from 0 to 20% by weight, preferably from 0 to 18% by weight, in particular from 0 to 15% by weight, of a flame retardant.

Flame retardants which may be used are organophosphorus compounds, such as phosphates or phosphine oxides.

Examples of phosphine oxides are triphenylphosphine oxide, tritolylphosphine oxide, trisnonylphenylphosphine oxide, tricyclohexylphosphine oxide, tris(n-butyl)phosphine oxide, tris-(n-hexyl)phosphine oxide, tris(n-octyl)phosphine oxide, tris-(n-cyanoethyl)phosphine oxide, benzylbis(cyclohexyl)phosphine oxide, benzylbisphenylphosphine oxide and phenylbis(n-hexyl)phosphine oxide. Particular preference is given to the use of triphenylphosphine oxide, tricyclohexylphosphine oxide, tris(n-octyl)phosphine oxide or tris(cyanoethyl)phosphine oxide.

Possible phosphates are especially alkyl- and aryl-substituted phosphates. Examples of these are phenyl bis-dodecyl phosphate, phenyl bisneopentyl phosphate, phenyl ethyl hydrogenphosphate, phenyl bis(3,5,5-trimethylhexyl) phosphate, ethyl diphenyl phosphate, bis(2-ethylhexyl) p-tolyl phosphate, tritolyl phosphate, trixylyl phosphate, trimesityl phosphate, bis(2-ethylhexyl) phenyl phosphate, tris(nonylphenyl) phosphate, bis(dodecyl) p-(tolyl) phosphate, tricresyl phosphate, triphenyl phosphate, dibutyl phenyl phosphate, p-tolyl bis(2,5,5-trimethylhexyl) phosphate and 2-ethylhexyl diphenyl phosphate. Particularly suitable compounds are phosphorus compounds in which each R is aryl. Triphenyl phosphate, trixylyl phosphate, and also trimesityl phosphate are very particularly suitable here. Cyclic phosphates may also be used. Diphenyl pentaerythritol disphosphate is particularly suitable here. Resorcinol diphosphate is also preferred.

It is moreover also possible to use mixtures of different phosphorus compounds.

The novel thermoplastic molding compositions may, furthermore, comprise from 0 to 50% by weight, preferably from 0 to 30% by weight, in-particular from 0 to 20% by weight, of elastomeric polymers.

These elastomeric polymers, and also processes for their preparation, are known per se and are described, for example, in DE-A 41 29 499.

Merely as examples, mention may be made here of graft rubbers with a crosslinked elastomeric core and a graft shell of polystyrene, EP rubbers, EPDM rubbers, block copolymers and thermoplastic polyester elastomers.

Corresponding products are also available commercially, e.g. a polyoctylene under the designation Vestenamer® (H üls AG), and also a wide variety of suitable block copolymers having at least one vinylaromatic and one elastomeric block. Examples which may be mentioned are the Cariflex® TR grades (Shell), the Kraton® G grades (Shell), the Finaprene® grades (Fina) and the Europrene® SOL grades (Enichem).

Preference is given to the use of block copolymers.

The novel thermoplastic molding compositions may, in addition, comprise from 0 to 50% by weight, preferably from 0 to 40% by weight, in particular from 0 to 35% by weight, of fibrous or particulate fillers or mixtures of these.

Examples of these are carbon fibers, glass fibers, glass mats, glass-fiber rovings and glass beads, and also potassium titanate whiskers and aramid fibers, preferably glass fibers. Glass fibers may be provided with a size and a coupling agent. These glass fibers may be incorporated either in the form of short glass fibers or else in the form of continuous strands (rovings). Preferred glass fibers comprise an aminosilane size.

Use may also moreover be made of amorphous silica, magnesium carbonate, powdered quartz, mica, talc, feldspar or calcium silicates.

The total of the % by weight of the components used is 100 in every case.

The novel thermoplastic molding compositions can be obtained by mixing the individual components at from 270 to 350° C. in conventional mixing apparatus, such as kneaders, Banbury mixers or single-screw extruders, but preferably using a twin-screw extruder. In order to obtain a very homogeneous molding composition, intensive and thorough mixing is necessary. The sequence of mixing the components may be varied, and therefore it is possible to premix two, or if desired three, components, or else to mix all of the components together simultaneously.

The novel thermoplastic molding compositions have improved flowability, reduced water absorption and with this improved hydrolysis resistance, and also better dimensional stability. They are suitable for producing fibers, films or moldings.

EXAMPLES

The following components were used:

Component A)

An s-PS with $M_w$=240 200, $M_w/M_n$=1.41 and a syndiotactic fraction, by $^{13}$C-NMR, of >96%, prepared as follows:

2.0 mol of styrene (208.3g) were charged to a round-bottomed flask in which inert conditions had been created using nitrogen, heated to 70° C., and mixed with 1.1 ml of methylaluminoxane (MAO) solution from Witco (1.53 molar in toluene). The mixture was then mixed with 46.04 mg (16.67·10$^{-5}$ mol) of pentamethylcyclopentadienyltitanium trimethylate. A further 9.8 ml of the above-mentioned MAO solution were then added. The internal temperature was controlled at 70° C., and polymerization was allowed to proceed for 1 hour. The polymerization was then terminated by adding methanol. The polymer obtained was washed with methanol and dried at 50° C. under reduced pressure. The molecular weight distribution was determined by high-temperature GPC (Gel permeation chromatography) with 1,2,4-trichlorobenzene as solvent at 135° C. Calibration was with narrowly distributed polystyrene standards.

The molecular weight $M_w$ was determined by GPC in 1,2,4-trichlorobenzene as solvent at 120° C.

Components B)

B1) A polyhexamethyleneadipamide (Nylon-6,6) with a viscosity number VN of 150 ml/g (Ultramid® A3 from BASF Aktiengesellschaft).

B2) A poly-ε-caprolactam (Nylon-6) with a viscosity number VN of 125 ml/g (Ultramid® B25 from BASF Aktiengesellschaft).

B3) A polyhexamethyleneadipamide (Nylon-6,6) with a viscosity number VN of 75 ml/g (Ultramid® A15 from BASF Aktiengesellschaft).

The viscosity numbers VN of components B1), B2) and B3) were each determined in 0.5% strength by weight solution in 96% strength sulfuric acid at 25° C.

Component C)

A modified polyphenylene ether, prepared at 300° C. in a twin-screw extruder by reacting $c_1$) 99% by weight of poly(2,6-dimethyl-1,4-phenylene ether) with ηred=0.48 dl/g (determined in 1% strength by weight solution in chloroform at 25° C.) and $c_3$) 1% by weight of fumaric acid.

The melt was devolatilized, extruded, passed through a water bath and pelletized.

Examples 1 to 3
Preparation of the Thermoplastic Molding Compositions

Components A), B) and C) were mixed in a twin-screw extruder (ZSK 30 from Werner & Pfleiderer) at 285° C., extruded, cooled in a water bath and pelletized.

The dried granules were then processed at 290° C. to give discs thickness 2 mm, diameter 60 mm), flat test specimens (127 mm 12.7 mm×1.6 mm) and standard small specimens (50 mm×6 mm×4 mm), and tests carried out.

Comparative Examples 1c to 4c

Operations were carried out as in Examples 1 to 3.

For determining water absorption, square specimens (10 mm×10×1 mm) were placed in distilled water and, after a specified time, removed, dried and weighed. The relative weight increase [%] is based on the weight of the untreated specimen.

The viscosity [Pas] was determined at 290° C. for a L/D capillary ratio of 30:1 (L=30 mm, D=1 mm) and a shear rate of 58 1/s.

The formulation of the molding compositions and their properties are given in the Table below.

2. The thermoplastic molding composition as claimed in claim 1, which comprises an amount of from 15 to 89.8% by weight of component A), an amount of from 10 to 80% by weight of component B) and an amount of from 0.2 to 40% by weight of component C).

3. The thermoplastic molding composition as claimed in claim 1, wherein component A) is built up from compounds of formula I

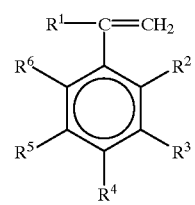

where:

$R^1$ is hydrogen or $C_1$–$C_4$-alkyl, $R^2$ to $R^6$ independently of one another, are hydrogen, $C_1$–$C_{12}$-alkyl, $C_6$–$C_{18}$-aryl, or halogen, or where two adjacent radicals jointly are a cyclic group having from 4 to 15 carbon atoms.

4. The thermoplastic molding composition as claimed in claim 1, wherein component C) is built up from $c_1$) from 70 to 99.95% by weight of a polyphenylene ether, $c_2$) from 0 to 25% by weight of a vinylaromatic polymer, and

|     | Formulation [% by weight] |     |     |     |     | Water absorption [%] |     |     |     | Viscosity |
| --- | --- | --- | --- | --- | --- | --- | --- | --- | --- | --- |
| Ex. | A) | B1) | B2) | B3) | C) | after 1 day | after 3 days | after 5 days | after 10 days | [Pas] |
| 1   | 55  | 43  | —   | —   | 2   | 0.12 | 0.52 | 0.81 | 0.99 | 630 |
| 2   | 55  | —   | 43  | —   | 2   | 0.18 | 0.73 | 0.84 | 1.15 | 490 |
| 3   | 55  | —   | —   | 43  | 2   | 0.09 | 0.69 | 0.93 | 1.02 | 280 |
| 1c  | 100 | —   | —   | —   | —   | 0.05 | 0.17 | 0.14 | 0.18 | 920 |
| 2c  | —   | 100 | —   | —   | —   | 1.18 | 2.40 | 3.10 | 4.70 | 250 |
| 3c  | —   | —   | 100 | —   | —   | 1.52 | 2.81 | 3.86 | 5.25 | 190 |
| 4c  | —   | —   | —   | 100 | —   | 1.73 | 3.42 | 4.01 | 5.77 | 110 |

We claim:

1. A thermoplastic molding composition comprising

A) from 5 to 97.9% by weight of a vinylaromatic polymer with syndiotactic structure, B) from 20 to 90% by weight of a low-viscosity polyamide with a viscosity number VN in the range from 50 to 150 ml/g, and C) from 0.1 to 50% by weight of a polar-group-modified polyphenylene ethers, the total of the percent by weight of A), B), and C) being 100.

$c_3$) from 0.05 to 5% by weight of at least one compound which contains at least one double or triple bond and at least one functional group selected from the group consisting of carboxylic acids, carboxylic esters, carboxylic anhydrides, carboxamides, epoxides, oxazolines and urethanes.

5. A fiber, a film or a molding produced from, as essential component, the thermoplastic molding compositions as claimed in claim 1.

* * * * *

UNITED STATES PATENT AND TRADEMARK OFFICE
CERTIFICATE OF CORRECTION

PATENT NO.: 6,093,771

DATED: July 25, 2000

INVENTOR(S): WUENSCH et al.

It is certified that error appears in the above-identified patent and that said Letters Patent is hereby corrected as shown below:

Col. 7, claim 1, line 66, "ethers" should be --ether--

Signed and Sealed this

Seventeenth Day of April, 2001

Attest:

NICHOLAS P. GODICI

Attesting Officer     Acting Director of the United States Patent and Trademark Office